United States Patent [19]

Kulak

[11] Patent Number: 4,763,433

[45] Date of Patent: Aug. 16, 1988

[54] METAL LIGHTED LURE

[76] Inventor: Walter Kulak, 98 Oakdale Village, North Brunswick, N.J. 08902

[21] Appl. No.: 85,326

[22] Filed: Aug. 11, 1987

Related U.S. Application Data

[63] Continuation of Ser. No. 436,314, Dec. 30, 1982, abandoned.

[51] Int. Cl.⁴ ............................................. A01K 85/00
[52] U.S. Cl. ..................................................... 43/17.6
[58] Field of Search ................................. 43/17.5, 17.6

[56] References Cited

U.S. PATENT DOCUMENTS

| | | | |
|---|---|---|---|
| 1,982,609 | 11/1934 | Freese | 43/42.34 X |
| 2,002,135 | 5/1935 | Barton | |
| 2,314,521 | 3/1943 | Schwartz | |
| 2,458,611 | 1/1949 | Long | 43/17.5 |
| 2,665,511 | 1/1954 | Bradberry | |
| 2,706,359 | 4/1955 | Beames | |
| 2,754,610 | 7/1956 | Carlson | |
| 3,177,604 | 4/1965 | Ewing | |
| 3,670,447 | 6/1972 | Wohead | |
| 3,693,278 | 9/1972 | Mahone, Jr. | |
| 3,705,465 | 12/1972 | Charney | |
| 3,721,033 | 3/1973 | Haynes | 43/17.6 |
| 3,863,380 | 2/1975 | Purlia | |
| 3,940,868 | 3/1976 | Northcutt | |
| 3,990,172 | 11/1976 | Hagquist | |
| 4,175,348 | 11/1979 | Ray | 43/17.6 |
| 4,250,650 | 2/1981 | Fima | 43/17.6 |
| 4,250,651 | 2/1981 | Ramme | |
| 4,437,256 | 3/1984 | Kulak | |

Primary Examiner—Nicholas P. Godici
Assistant Examiner—Karen Skillman
Attorney, Agent, or Firm—Sprung Horn Kramer & Woods

[57] ABSTRACT

A metal fishing lure containing a light emitting diode therein which is in direct communication with one or more passageways formed by one or more holes in the lure. Light is thus allowed to pass directly from the interior of the diode to the exterior thereof. Two miniature hearing aid batteries inserted in the lure power the light emitting diode.

10 Claims, 2 Drawing Sheets

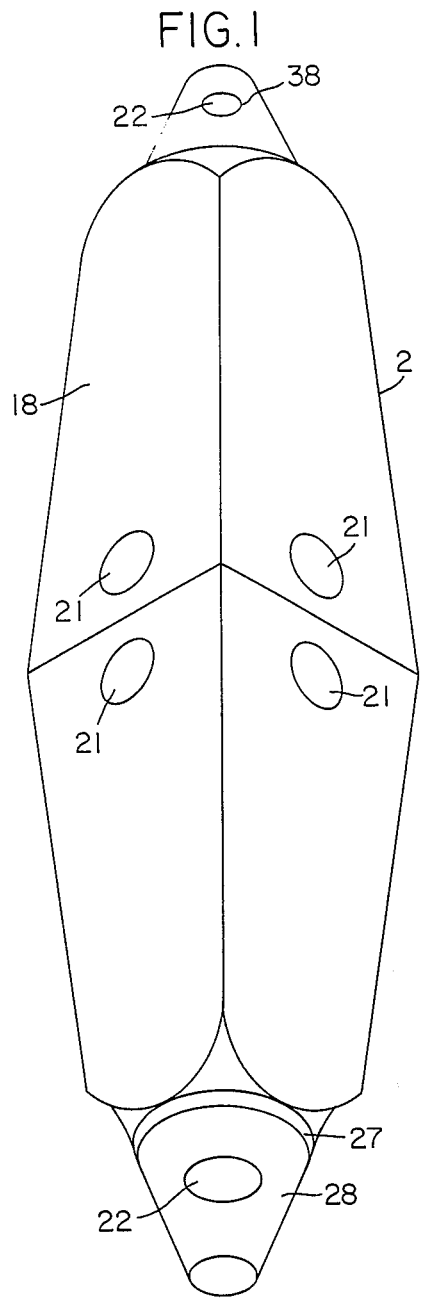
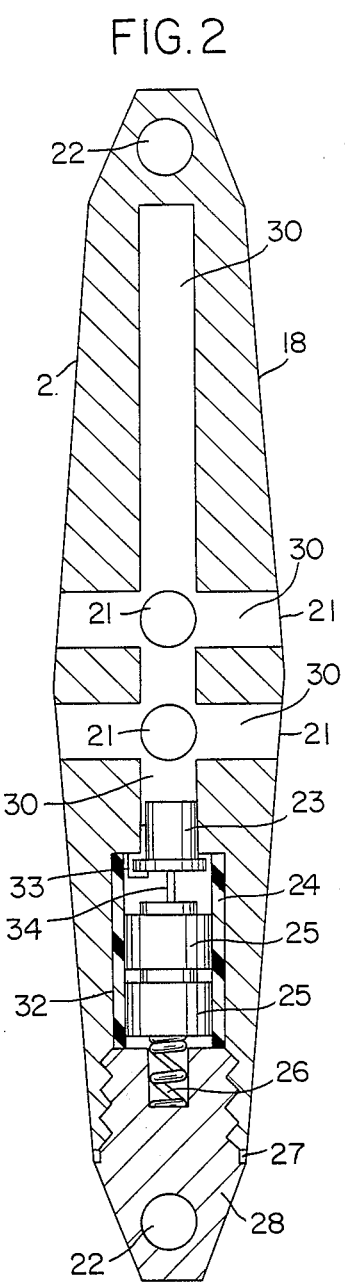
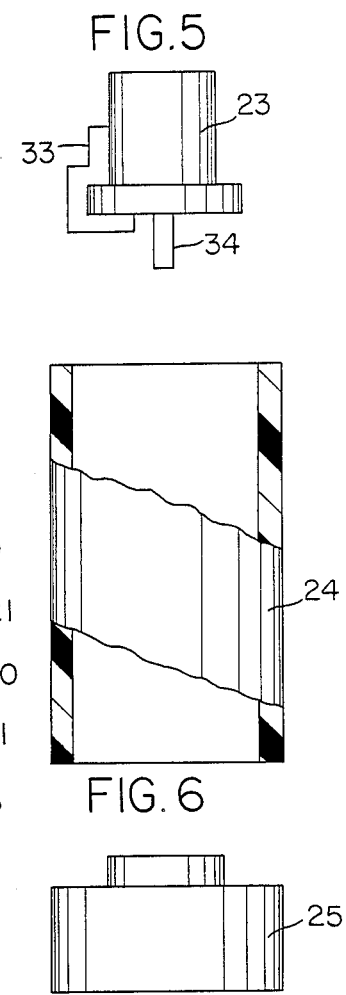
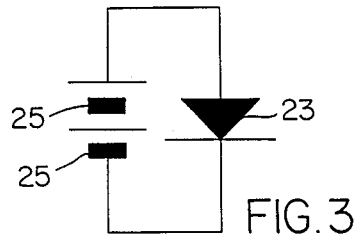
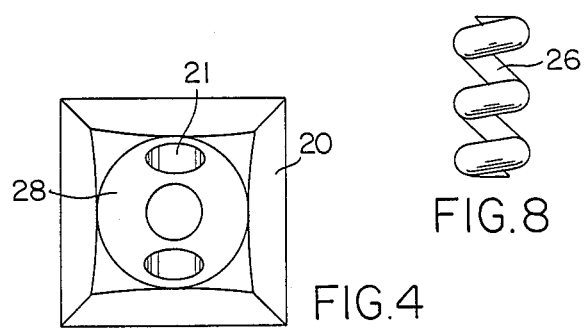

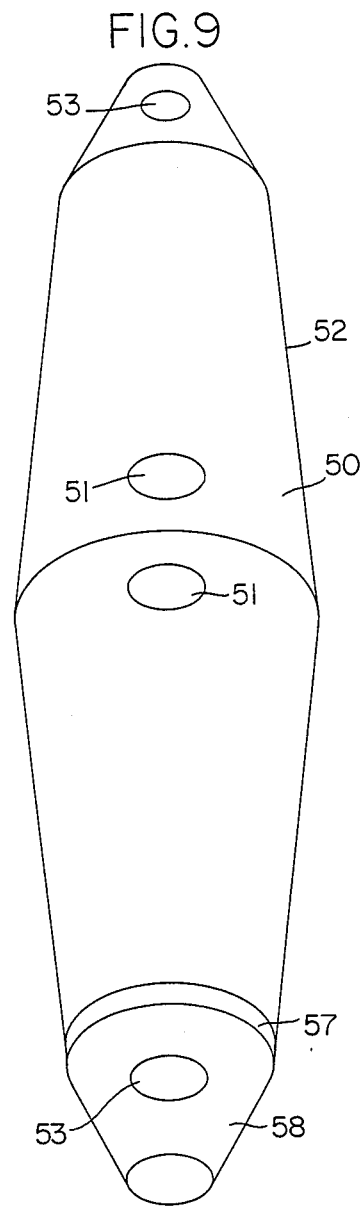
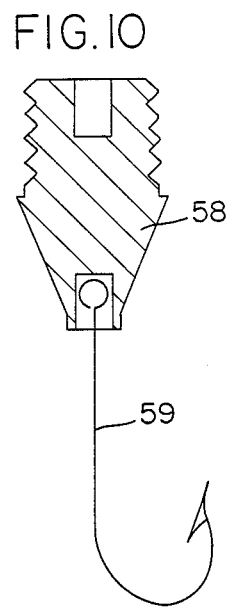
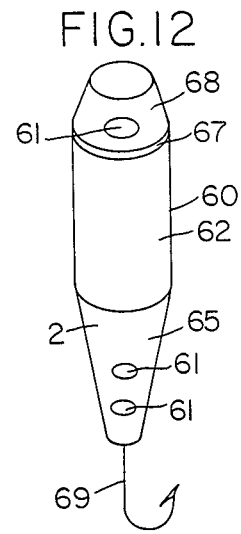
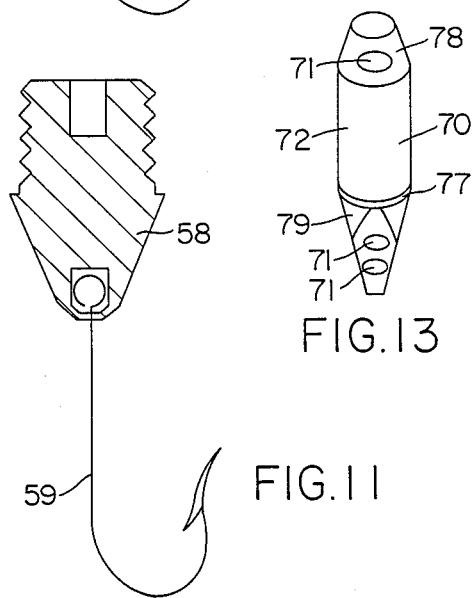
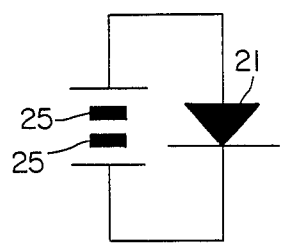
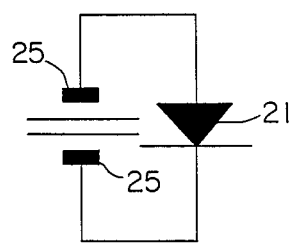

METAL LIGHTED LURE

This application is a continuation of application Ser. No. 436,314, filed Dec. 30, 1982, now abandoned.

BACKGROUND OF THE INVENTION

The present invention concerns a lighted fishing lure.

Diamond lures have heretofore been in use for ocean fishing.

SUMMARY OF THE INVENTION

The present invention concerns a metal lighted fishing lure with a light produced in any color by a light emitting diode powered by two miniature hearing aid batteries 13 series. The batteries are inserted into the metal lighted lure from one end thereof.

The metal lighted lure can also flash by using a flash light emitting diode. Light emitting diodes come in a large color range—manufacturers can produce them in any color.

There has to be at least one hole for the light to exit from interior to the exterior of the solid metal lighted lure. The metal lighted lure has holes drilled for the light to exit and these holes can be in any shape and form. The light illuminates the exterior of the lure.

The metal lighted lure can have as many holes for light to exit as the size of the lure will allow. This light exits from the interior of the light emitting diode to the exterior of the lure in the color of the diode, with steady light, or flash, illuminating reflection, without any loss of flash to the lure.

There are no dead spots, like in the conventional metal lure, which depends on the rays of the sun, and functions only in the day.

The metal lighted lure is lit, or flashes day or night, therefore it is effective day or night, since it has its own source of light.

The diode can be insulated against water entering the chamber of the main body of the metal lighted lure.

Experiments showed applicant herein that fresh or saturated salt water entering the chamber of the main body of the metal lighted lure has no bearing, and the metal lighted lure will give 24 to 30 hours of constant light.

The metal lighted lure can be made from any metal, then chrome plated, but the ideal metal is stainless steel, for it has the desirable silver color and does not tarnish, nor is affected by the salt water, does not need plating and has the weight for deep sea fishing. Polishing would help, but is not required.

The metal lighted lure can also have two lights of different color at the same time, on the exterior of the metal lighted lure, or one light of one color and flash at the same time in any color of choice. There is a good assortment color combination that can be incorporated by the light emitting diodes of choice.

The lure of the present invention is in constant motion when used, and produces constant flash day or night, antagonizing fish to strike the metal lighted lure.

Metal lighted lures are made small and large. Small and light lures are used for fresh water fishing, and large and heavy lures are used for ocean deep sea fishing.

A metal lighted lure of a diamond shape has the advantage that there are no dead spots in producing constant flashing, and can be used day or night—a lure that is effective and productive at night.

Metal lighted lures can also be produced tapered, or cylindrical by a screw machine at the rate of 3000 an hour by one machine.

The metal lighted lure of the present invention does not have to be insulated from fresh or salt water, as the metal lighted lure function for 24 to 30 hours of continuous use, without noticeable discharge.

The metal lighted lure of the present invention can be made with more than one color of light coming from interior to the exterior producing mingling radiant rainbow colors, antagonizing fish to strike the metal lighted lure.

The metal lighted lure can be used to decorate a Christmas tree as a Christmas ornament, or made into a twinkling star, or any decoration, and will not cause a fire. Power can be utilized to produce the singing birds effect—there is no limit to the possibilities.

Metal lighted lures are made on a screw machine. Some other models of metal lighted lures have to be milled, which would reduce the ratio of output, but have the benefit of twisting and thus more antagonizing for fish to strike the metal lighted lure.

BRIEF DESCRIPTION OF THE DRAWINGS

FIG. 1 shows an exploded isometric drawing of a diamond metal lighted lure according to the present invention.

FIG. 2 shows a sectional view of the metal lighted lure of FIG. 1 and shows the light emitting diode energized.

FIG. 3 shows a schematic drawing of the circuit shown in FIG. 2.

FIG. 4 shows on end bottom view of FIG. 1 (the top view of FIG. 1 would be the same, except that it would be all a solid body).

FIG. 5 shows an exploded view of the light emitting diode of FIG. 2 with cathode and anode leads.

FIG. 6 shows an isometric view of another embodiment of a lure according to the present invention showing a lure turned by a screw machine.

FIG. 7 shows a partial sectional view of FIG. 9, and also shows a fishing hook placed inside the end cap before crimping.

FIG. 8 shows a partial sectional view of FIG. 7 with a fishing hook crimped inside the end cap.

FIG. 9 shows an isometric view of another lure according to the present invention.

FIG. 10 shows an isometric drawing of another lure according to the present invention.

FIG. 11 shows a schematic circuit showing a placement of the batteries for the unit to maintain the diode in an "OFF" position.

FIG. 12 shows another schematic circuit showing the placement of the batteries such that it can be used to keep the diode in an "OFF" position.

DETAILED DESCRIPTION OF THE INVENTION

FIG. 1 shows a lure 18 having a main body 20 with holes 21 drilled partly or all the way through the lure 18. From such holes 21 light will exit from the interior of the lure 18. FIG. 1 also shows drilled holes 22 where a line and hook can be attached (such line and hook not shown in FIG. 1). End cap 28 is disposed on the bottom end of main body 20. End piece 38 is disposed on the top end of the main body 20 or can be part of the main body 20. A lockwasher 27 connects threaded end cap 28 to the main body 20 (this is best seen in FIG. 2). The lure 18 can be made with a threaded end cap on both ends thereof, with a light emitting diode 23 on each side in any color.

FIG. 2 shows the interior of the main body 20 of lure 18. Holes 21 form internal light passageways 30 which connect the interior of the lure 18 to the exterior thereof. In FIG. 2, the light emitting diode 23 is energized by batteries 25. The light emitting diode 23 is pressed into a drilled hole (passageway) 30 in the main body 20 of lure 18, making an electrical connection with the metal body of the main body 20 of lure 18 via lead 33 and serving as well to keep the diode 23 in place. The other lead 34 of the diode 23 makes a series connection with batteries 25, thus completing the electrical loop through a spring 26 with connected batteries 25 to the metal end cap 28, which in turn is thread connected to the metal body of main body 20. The batteries 25 are insulated by a plastic sleeve 24 from the main body 20 formed by the sides of the drilled hole 32 for the diode 23 and batteries 25, thus preventing one battery 25 from shorting the other. Light from diode 23 thus passes from the interior of main body 20 of lure 18 via passageways 30 and exits through holes 21 to the exterior of the lure 18.

In FIG. 6 there is shown another embodiment of a lure according to the present invention. Lure 50 has a main body 52 with drilled holes 51 and drilled holes 53 for possible attachment to a line and hook (not shown in FIG. 6). End cap 58 is at the bottom end of a main body 52 and is connected thereto by lockwasher 57.

In FIG. 7 and FIG. 8, threaded end cap 58 is depicted with a fishing hook 59 at the bottom end thereof. In FIG. 7, the hook 59 is shown inside the end cap before crimping; in FIG. 8, the hook 59 is shown crimped inside the end by a press and die technique.

In FIG. 9, a further embodiment of a lure according to the present invention is depicted. Lure 60 has a main body 62 and an end cap 68 which is connected to main body 62 via lockwasher 67. Holes 61 are drilled into the lure 60. A fishing hook 69 is disposed at the bottom of the lower end piece 65. Lure 60 can be produced on a screw machine. The hook 69 can be crimped to the main body 62 in the same manner as described hereinabove in regard to FIG. 7 and FIG. 8.

FIG. 10 shows a further embodiment of a lure according to the present invention wherein a lure 70 has end caps and 79 of different designs. Lockwasher 77 connects end cap 79 to main body 72 of lure 70 (lure 70 can be produced without lockwasher 77). Drilled holes 71 pierce the lure 70. A hook can be tied through holes 71 in any conventional manner, or a spinner can be attached via a ring, or other means to the lure 70.

FIG. 11 and FIG. 12 depict schematic circuits showing placement of the batteries 25 in relation to the diode 23 so as to maintain the diode 23 in an "off" position to keep the batteries 25 from discharging. This is in comparison to the schematic circuit shown in FIG. 3 which shows the batteries 25 in relation to the diode 23 so as to maintain the diode 23 in an "on" position. Placement of the batteries 25 is important as it can be used as an "on" and "off" switch—to either energize the light emitting diode 23 or shut off the light emitting diode 23 and stop the batteries 25 from discharging.

What is claimed:

1. A lighted fishing lure comprising a metal main body having one or more holes therethrough to form one or more unobstructed passageways in said body whereby to allow water to enter the main body when the lure is placed in water;

a channel in said main body, said channel directly communicating with said passageways;
   a light emitting diode disposed in said channel such that the light from said diode directly communicates with said passageways, said diode having a first electrical lead and a second electrical lead, said first lead connects to said main body to form an electrical connection and to position the diode so as to form a space adjacent the diode to allow water entering the main body to pass by the diode; and
   one or more batteries disposed in said channel, said batteries having two terminals, said batteries positioned such that one of said terminals is electrically connectable to said second lead of said diode and the other of said terminals is electrically connectable to said main body, said diode and said one or more batteries being disposed in such channel so as to allow water entering said main body to pass through said space and to come into contact with said diode and said one or more batteries.

2. A lighted fishing lure according to claim 1, comprising two or more batteries and further comprising an insulating sleeve disposed between said channel and said batteries so as to prevent said batteries from shorting out.

3. A lighted fishing lure according to claim 1, wherein said body has a threaded end cap disposed at least on one end thereof.

4. A lighted fishing lure according to claim 3, wherein a spring is disposed between said batteries and said end cap.

5. A lighted fishing lure according to claim 1, wherein said main body has one or more holes therethrough in at least one end thereof to accommodate a hook.

6. A lighted fishing lure according to claim 1, wherein said batteries are miniature hearing aid batteries 13 series.

7. A lighted fishing lure according to claim 1, wherein there are two batteries.

8. A lighted fishing lure according to claim 1, wherein said light emitting diode is a flashing diode.

9. A lighted fishing lure according to claim 1, wherein said light emitting diode is colored.

10. A lighted fishing lure according to claim 1, wherein said body of the lure is fabricated from stainless steel.

* * * * *